May 12, 1964  B. STERNLICHT  3,132,906
HYDRODYNAMIC DEVICES
Filed Aug. 26, 1959  3 Sheets-Sheet 1

INVENTOR:
BENO STERNLICHT,
BY Paul A. Frank
HIS ATTORNEY.

May 12, 1964    B. STERNLICHT    3,132,906
HYDRODYNAMIC DEVICES
Filed Aug. 26, 1959    3 Sheets-Sheet 2
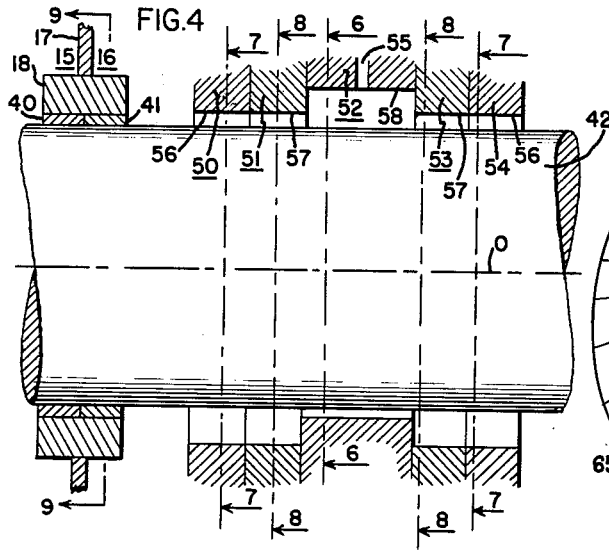
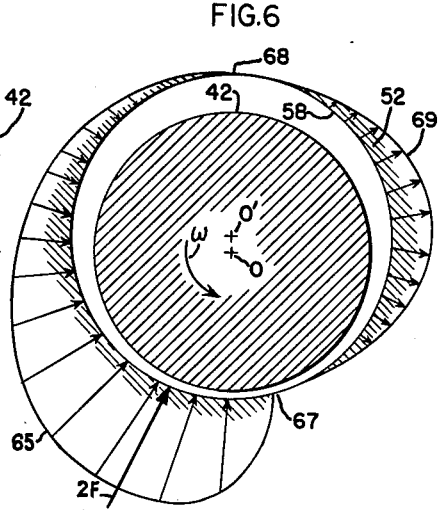
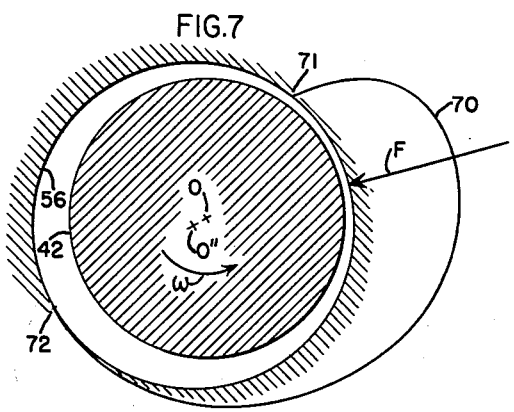
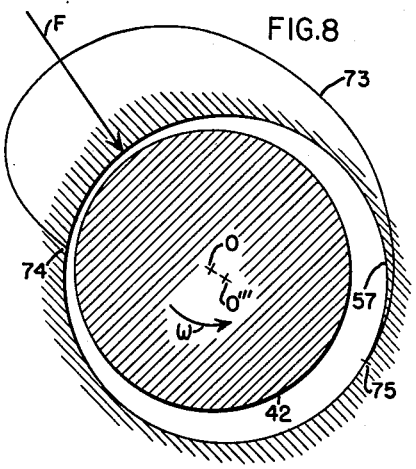
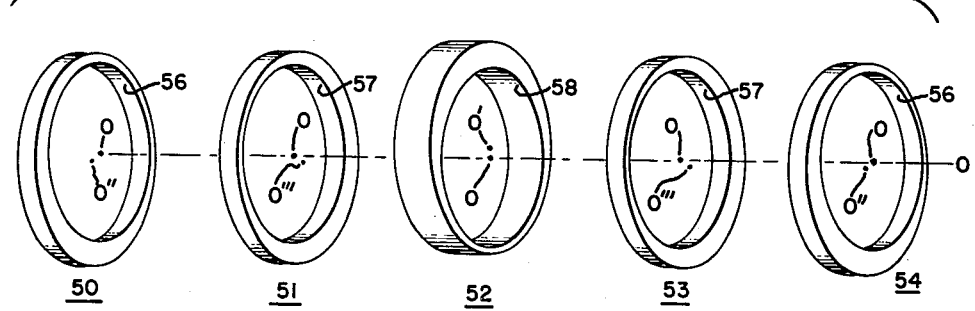
INVENTOR:
BENO STERNLICHT,
BY Paul A. Frank
HIS ATTORNEY.

May 12, 1964 B. STERNLICHT 3,132,906
HYDRODYNAMIC DEVICES
Filed Aug. 26, 1959 3 Sheets-Sheet 3
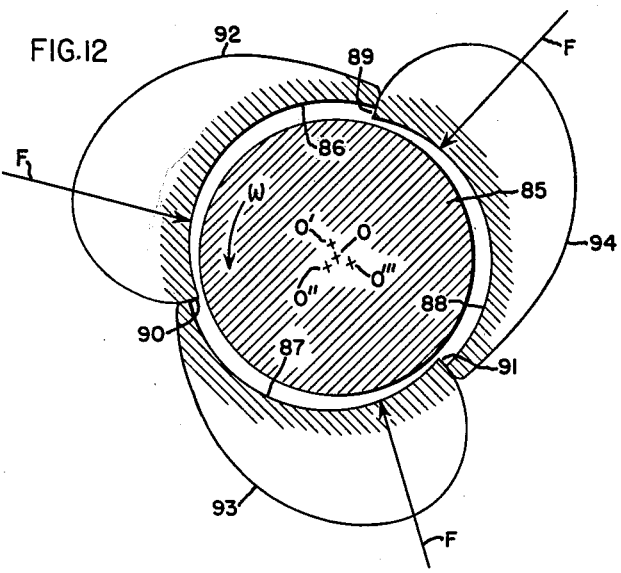
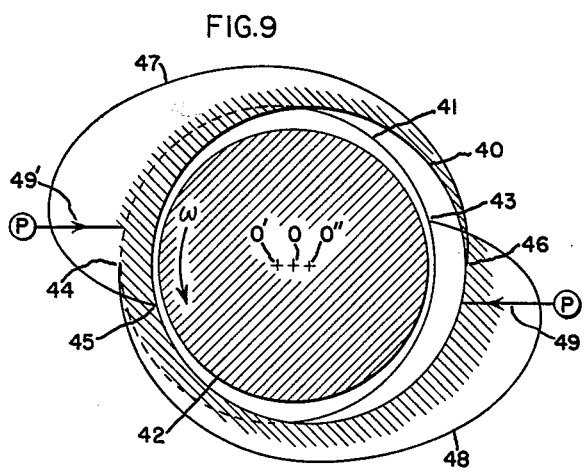
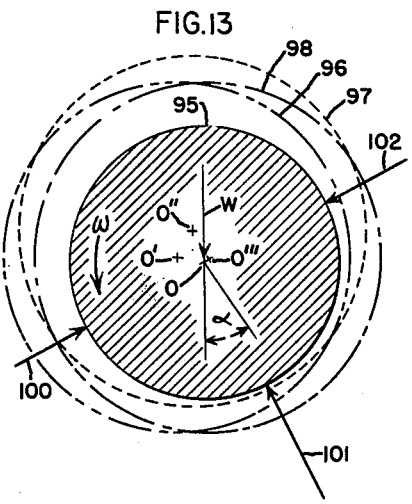
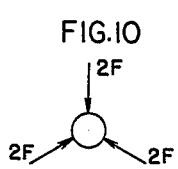
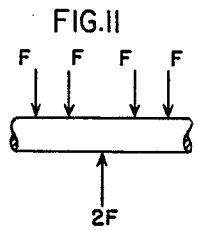
INVENTOR:
BENO STERNLICHT,
BY Paul A. Frank
HIS ATTORNEY.

United States Patent Office 3,132,906
Patented May 12, 1964

3,132,906
HYDRODYNAMIC DEVICES
Beno Sternlicht, Schenectady, N.Y., assignor to General
Electric Company, a corporation of New York
Filed Aug. 26, 1959, Ser. No. 836,161
2 Claims. (Cl. 308—122)

This application relates to hydrodynamic devices, and more particularly, to devices wherein hydrodynamic forces are utilized to perform sealing and bearing functions.

In turbine and compressor applications it is very common to pass rotating shafts through partitions which separate areas operating at extremely high pressure differentials. In order to maintain these areas at their desired pressures, it is necessary to provide suitable seals between the shaft and the partition to prevent leakage.

Generally, these seals are of a positive nature and rely on rubbing contact between the rotating and stationary portions of the seal. This type seal has high frictional losses and also the obvious defect that after a period of time sufficient wear of the rubbing parts takes place so as to provide a leakage path. Other type seals have also been advanced which rely on the pressure of one of the fluids being sealed. In such seals, a certain amount of leakage of the fluid used to perform the sealing function is inherent in the construction. Such seals have the added disadvantage that the sealing pressure cannot be greater than that of the fluids being sealed.

Labyrinth type seals have also been utilized. These seals are constructed on the premise that a certain amount of leakage will take place. Such seals do not provide a positive seal but rather tend to minimize leakage.

The chief object of the present invention is to provide an improved hydrodynamic sealing device.

An object of the present invention is to provide an improved hydrodynamic sealing device capable of operating at pressures higher than the pressures of the fluids being separated by the seal.

Another object of the invention is to provide a sealing device wherein rotation of the rotor portion thereof generates high fluid pressure areas about the rotor to form a seal.

A still further object of the invention is to provide a hydrodynamic sealing arrangement including means to stabilize the rotor in the seal by maintaining a plurality of high pressure areas about the rotor.

These and other objects will become more apparent from the following description.

The present invention relates to a hydrodynamic device including a rotor having an outer annular surface and a stator which envelops the rotor, the stator having a plurality of surfaces converging toward the surface of the rotor. Fluid is supplied between the stator and the rotor whereby rotation of the rotor causes the generation of high pressures in the converging areas between the rotor and the stator. The converging areas are so located that the high pressure areas are adjacent one another and are in communication with one another to form a continuous, annular, high pressure area of fluid about the rotor to form a seal between the rotor and stator. The term "converging" as used herein designates a decrease in the space between the surfaces of the rotor and stator in the direction of rotation of the rotor.

The present invention will be more clearly understood by referring to the detailed description of preferred embodiments shown in the attached drawings, in which:

FIGURE 4 is a sectional view of another embodiment of the invention further including a stabilized bearing construction;

FIGURE 5 is an exploded perspective view of the stabilized bearing construction shown in FIGURE 4;

FIGURES 6, 7, and 8 are sectional views taken along the lines 6—6, 7—7, and 8—8 of the stabilized bearing shown in FIGURE 4;

FIGURE 9 is a sectional view taken along the line 9—9 in FIGURE 4 and includes pressure distribution curve;

FIGURE 10 is a schematic showing of the resultant forces of the pressure areas formed by the converging portions of the stabilized bearing shown in FIGURE 4;

FIGURE 11 is a schematic showing of the forces generated in the converging portions of the stabilized bearing in FIGURE 4 showing the moment resisting orientation of the forces longitudinally along the rotor axis;

FIGURE 12 is a sectional view taken through a plane normal to the axis of the rotor of a hydrodynamic device incorporating both sealing and stabilizing functions; and FIGURE 13 is a schematic showing of a hydrodynamic device of the type shown in FIGURES 4 and 12 wherein the gravity load on the rotor causes the shaft to assume an attitude angle α.

Figure 1:
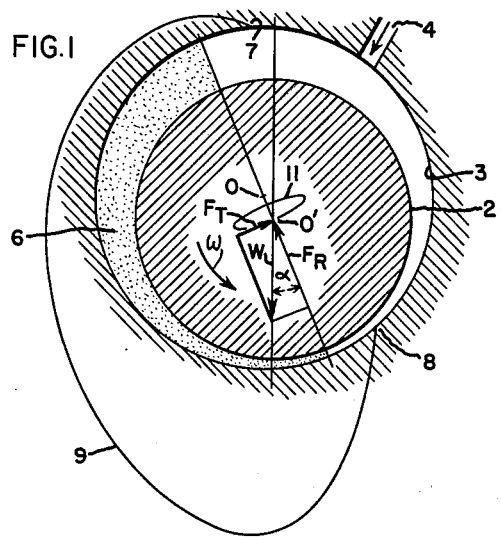
FIGURE 1 is a sectional view taken normal to the axis of a shaft enveloped by a stator and includes a pressure distribution curve of the hydrodynamic pressures generated between the shaft and stator.

Referring to FIGURE 1 there is shown a sectional view of a shaft 2 hydrodynamically supported in a suitable bearing 3. The ability of a fluid to provide a hydrodynamic wedge is partially the result of the viscosity and density of the fluid whereby the fluid resists changes in shape, and also the result of the eccentricity and the velocity of the shaft relative to the bearing. The eccentricity produces a converging area in which high pressures are developed due to the rotation of the journal. The magnitude and distribution of these pressures may be determined by means of the well known Reynolds' equation.

In FIGURE 1 a converging area exists between the shaft and the journal in the section to the left of the line O—O'. This converging area 6 is determined by the direction of rotation ω and the magnitude of the weight W of the rotor. This weight causes an attitude angle α to be assumed measured by a line passing through the center of the shaft and the center of the bearing and a line extending in the direction of the weight of the shaft. It will be appreciated that the eccentricity and clearances shown are exaggerated for the sake of clear illustration.

Because of this weight W and the direction of rotation ω a positive pressure area is generated in the converging area 6. This high pressure extends from the point 7 on the bearing to the point 8 going in a counter-clockwise direction. The distance between the line 9 and the bearing surface 3 signifies the magnitude of the hydrodynamic pressure at the point adjacent the surface 3. Extending from the point 8 counter-clockwise to the point 7 is a negative pressure area or a vacuum. It is normal to introduce fluid lubricant in this sector to the space between the shaft and bearing. A passage 4 is provided for this purpose.

When the shaft assumes an attitude angle α there is a restoring force $F_R$ which urges the shaft in a direction passing through the line O—O'. Because of the direction and magnitude of the force W there is a component $F_T$ acting normal to the force $F_R$. These forces are all considered to act on the center of the shaft 2.

It can be seen that as the weight W diminishes there will be a tendency for the shaft to pass closer to the center O of the bearing. Because of the component $F_T$ there is a driving force which tends to move the axis of the shaft O' along the locus 11. In the case of a horizontal shaft the weight M will cause this path 11 to be an oval spaced from the center of the bearing O. In the case of a vertical shaft this path 11 will tend to circumscribe the center O.

Figure 2:
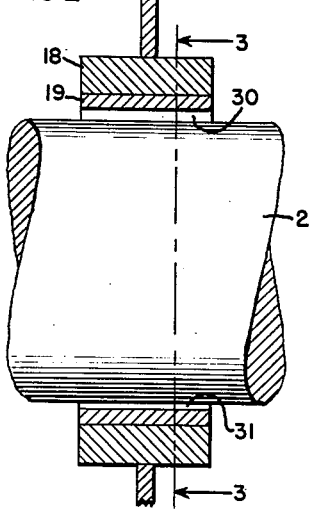
FIGURE 2 is a sectional view of a hydrodynamic device comprising the present invention.

In FIGURE 2 there is disclosed a hydrodynamic device employing the present invention. A first pressure area 15 exists on one side of the partition 17 and a second pressure area 16 is present on the opposite side of the partition 17. Passing through this partition 17 is a suitable sleeve 18 having a suitable stator construction 19 enveloped by the sleeve 18.

Figure 3:
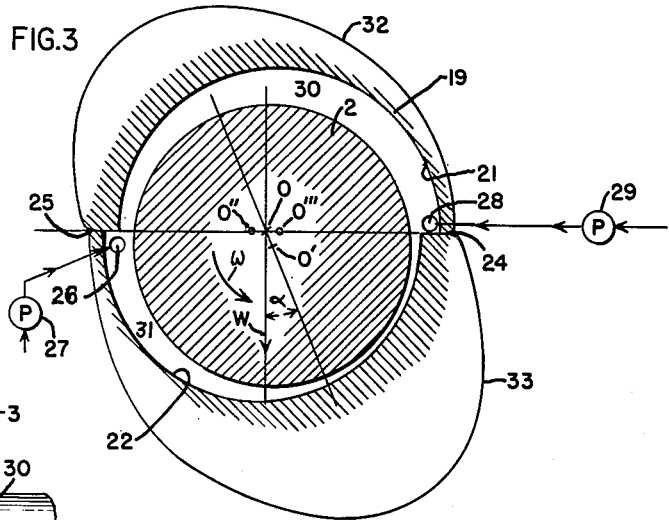
FIGURE 3 is a sectional view taken along the line 3—3 of the hydrodynamic device shown in FIGURE 2 and includes a pressure distribution curve.

FIGURE 3 discloses a sectional view of the shaft and stator construction shown in FIGURE 2 taken in a plane normal to the shaft axis. The shaft has a general cylindrical shape and the stator comprises a semi-cylindrical portion defining the surface 21 which has its center at O''' and a second surface 22 which has its center at O''. These semi-cylindrical portions 21 and 22 are offset and are connected by step portions 24 and 25. In this embodiment the shaft is horizontally disposed. The shaft has a given weight W and rotates at a speed $\omega$. The shaft will therefore assume an attitude angle $\alpha$ and a new rotational center O' which is spaced from the center O.

In this construction the entire shaft 2 is enveloped by converging areas 30 and 31. However, the convergence in the area 31 is more pronounced than in the area 30. The result of this difference in convergence is shown in the pressure curves 32 and 33. The pressures in the converging area 31 are extremely great whereas in the area 30 they are of a lesser magnitude. However, these curves show that high pressure areas pass completely around the shaft 2. By creating high pressure areas between the shaft 2 and the stator 19, an effective seal is provided between the areas 15 and 16 shown in FIGURE 2. If desired these pressures may be of a magnitude exceeding 4,000 pounds per square inch.

In order to maintain the pressures shown in FIGURE 3 it is necessary to supply lubricant between the rotor and stator. Lubricant is introduced between the shaft and stator at points 26 and 28. At these points the hydrodynamic pressures are lowest and the pumps 27 and 29 are not required to overcome the pressures created at the points of greatest convergence which as previously noted may be of a magnitude of 4,000 pounds per square inch.

Referring to FIGURE 4 there is shown another embodiment of the invention wherein the shaft of the device is supported by a stabilized bearing. The sealing device comprises a sleeve 18 which passes through a partition 17 which separates the pressure areas 15 and 16. The sleeve 18 has a shaft 42 passing therethrough. The shaft 42 is enveloped by a stator construction comprising two annular portions 40 and 41. The stabilized bearing construction comprises a first bearing portion 50, a second bearing portion 51, a third bearing portion 52, a fourth bearing portion 53 and a fifth bearing portion 54. It will be noted that the first, second, fourth and fifth bearing portions are of the same width and the third bearing portion is of a double width.

Referring to FIGURE 5 there is shown an exploded perspective view of the stabilized bearing shown in FIGURE 4. From this view it can be seen that the bearing surfaces of each of the bearing portions are eccentric to the shaft axis O. The first bearing portion 50 and the fifth bearing portion 54 are concentric. The second bearing portion 51 and the fourth bearing portion 53 are concentric. The centers of the first and third, second and fourth, and third bearing portions are equidistant from the center of the shaft and are spaced at equal angles of 120° about the axis O.

Referring to FIGURE 6 there is shown a sectional view through the line 6—6 of the third bearing portion shown in 52. It can be seen from this sectional view that the shaft center O is eccentric of the bearing portion center O'. This creates a high pressure area between the bearing surface 58 and the shaft surface 42 extending from the point 68 counter-clockwise to the point 67. This creates a positive pressure curve shown as 65 which has a resultant force of a magnitude 2F. There is also a low pressure area extending from the point 67 counter-clockwise to the point 68 on the bearing surface 58 and this is shown as a negative pressure by the curve 69. Because of this negative pressure this area is suitable for passing fluid to the bearing surfaces by means of the passage 55 shown in FIGURE 4.

Referring to FIGURE 7 there is shown a sectional view taken through the line 7—7 of bearing portions 50 and 54. In this view it can be seen that the bearing surface axis O'' is spaced 120° from the bearing surface axis O' shown in FIGURE 6. This eccentric disposition of the bearing surface 56 relative to the shaft surface 42 creates a high pressure area due to the converging nature of the shaft and stator surfaces extending from the point 72 counter-clockwise to the point 71. The pressure distribution is shown on the curve 70 and the resultant force F is also indicated.

Similarly FIGURE 8 shows a sectional view taken along the line 8—8 of the bearing portions 51 and 53. Positive pressure exists along surface 57 from the point 75 in a counter-clockwise direction to the point 74. The pressure distribution is indicated by the curve 73 and the resultant force F for this pressure area is also shown.

From FIGURES 6, 7 and 8 it can be seen that the third bearing portion 52 has a resultant force 2F. The first and third bearing portions each have a force F which act in the same direction and therefore the total force is equal to 2F. FIGURE 8 shows the resultant forces F from the bearing portions 51 and 53. The sum of these forces is also 2F and this force shown in FIGURE 8 is spaced 120° from each of the forces shown in FIGURES 6 and 7.

Referring to FIGURE 10 it can be seen that these forces tend to stabilize the bearing by applying forces 2F spaced substantially equally about 360° of the shaft thereby tending to create a resisting component of force to the force $F_T$ shown in FIGURE 1 which as initially stated tends to whirl the axis of the shaft while it rotates.

FIGURE 11 shows the forces F created by the hydrodynamic pressures of the eccentric bearing portions on the shaft 42 taken longitudinally along the axis O of the shaft 42. A perusal of these forces indicates that the distribution in a five element bearing also creates equilibrium by counteracting any unbalanced moments about the bearing axis.

FIGURE 9 discloses a sectional view of the hydrodynamic device constituting the seal taken along the line 9—9 shown in FIGURE 4. This device comprises two annular members 40 and 41 being longitudinally spaced along the shaft 42. However, these members are adjacent and in contact with one another. The surface 41 has a center O' which is spaced from the shaft axis O. The surface 40 has a center O'' also spaced from the axis O of the shaft 42 and angularly disposed 180° from the center O' about the axis O. By this orientation of the surfaces 40 and 41 it can be seen that two high pressure areas are created which are also angularly spaced 180°. It is common for such high pressure areas to extend approximately 200° for each converging area of an annular surface. Therefore by having the converging areas spaced by 180° a certain amount of overlap exists. Since the bearing portions are adjacent to one another the high pressure areas about the shaft 42 are continuous for the full 360°.

In FIGURE 9 the pressure area for the surface 41 extends from the point 44 counter-clockwise to the point 43 and for the surface 40 from the point 46 to the point 45 also in a counter-clockwise direction. The pressure curves 47 and 48 so generated can be seen to intersect thereby creating a continuous high pressure area about the shaft 42. As previously mentioned fluid is normally introduced at a low pressure area. Fluid for the surface 40 is introduced through the line 49 and for the surface 41 through the line 49'.

In FIGURE 12 there is shown another embodiment of the invention in which the sealing functions and the stabilizing functions are incorporated in a single stator member. The shaft 85 has center O and rotates in a direction ω. The stator comprises three portions 86, 87 and 88. These portions are sectors of cylinders having the respective centers O', O'', O'''. The arc of each of the portions 86, 87 and 88 are equal in length and are spaced at 120° intervals. Each portion is connected by a step portion. The portion 86 is connected to the portion 87 by means of the step 90. The portion 87 is connected to the portion 88 by means of the step 91, and the portion 88 is connected to the portion 86 by the step 89. In the case of a vertical shaft the center of the shaft 85 and the stator are substantially concentric about the axis O therefore the converging areas about the shaft are substantially equal, creating substantially equal pressures shown by curves 92, 93 and 94. These pressure distribution curves define resultant forces F which are spaced at 120° intervals.

FIGURE 12 discloses that three converging and continuous pressure areas are generated and also that resultant forces are created which tend to stabilize the shaft axis and maintain this axis substantially concentric with the stator axis.

FIGURE 13 discloses a stabilized bearing construction such as that shown in FIGURE 4 wherein the shaft 95 passes through three groups of eccentric bearing surfaces 96, 97 and 98, equally spaced about the axis O and having centers O', O'', and O'''. In this embodiment the influence of the weight W of the shaft is shown as it would occur in a horizontal shaft installation. The center O of the shaft 95 is oriented at an attitude angle α thereby causing different degrees of convergence with the bearing surfaces 96, 97 and 98. Since the convergence varies with each surface, the magnitude and direction of the forces F are shown as having different magnitudes and angular dispositions as indicated in FIGURE 13 as 100, 101 and 102. Force 101 substantially indicates the load carry capacity of the construction. The forces 100 and 102 substantially tend to minimize the whirl of the shaft 95.

From the foregoing description it will be appreciated that under certain circumstances it may be desirable that the orientation of the various arcuate portions which constitute the hydrodynamic device may be changed so that the length, clearance and angular disposition of the converging areas is such as to provide a desired pressure curve about the rotor.

While there have been described preferred embodiments of the present invention, it will be appreciated that the invention is not limited thereto but that various modifications may be made without departing from the scope of the appended claims.

What I claim as new and desire to secure by Letters Patent of United States is:

1. In combination, a rotor having an outer cylindrical surface, a stator substantially enveloping said rotor, and including five axially spaced bearing portions, the first and fifth bearing portions being of equal width and being concentric to each other, the second and fourth bearing portions being of equal width to the first and fifth bearing portions and being concentric with one another, and a third bearing portion having a bearing width twice that of the first bearing portion, the centers of the groups of bearing portions being equally spaced on a circle substantially concentric with the rotor axis, said bearing portions defining a plurality of surfaces converging toward the cylindrical surface of the rotor, means for supplying fluid between the stator and the rotor, rotation of the rotor causing the generation of high pressures in the converging areas between the rotor and the stator, the resultant forces of each said high pressure areas acting upon major portions of the annular surface of the rotor to stabilize the rotor in said stator to substantially limit the movement of the axis of the rotor during rotation thereof.

2. The combination according to claim 1 further comprising means defining a plurality of stationary converging portions substantially enveloping the rotor to form a plurality of high pressure areas adjacent to one another and in communication with another, to form continuous annular high pressure area about the rotor.

References Cited in the file of this patent

UNITED STATES PATENTS

| | | |
|---|---|---|
| 1,236,511 | Waring | Aug. 14, 1917 |
| 2,093,521 | Howarth | Sept. 21, 1937 |
| 2,602,583 | Haeberlein | July 8, 1952 |
| 2,679,438 | Love | May 25, 1954 |
| 2,884,282 | Sixsmith | Apr. 28, 1959 |
| 2,964,339 | Macks | Dec. 13, 1960 |

FOREIGN PATENTS

| | | |
|---|---|---|
| 514,555 | France | Nov. 16, 1920 |
| 165,793 | Austria | Apr. 25, 1950 |